US006870951B2

(12) United States Patent
Cai

(10) Patent No.: US 6,870,951 B2
(45) Date of Patent: Mar. 22, 2005

(54) METHOD AND APPARATUS TO FACILITATE AUTO-ALIGNMENT OF IMAGES FOR DEFECT INSPECTION AND DEFECT ANALYSIS

(75) Inventor: Lynn Cai, Union City, CA (US)

(73) Assignee: Numerical Technologies, Inc., Mountain View, CA (US)

( * ) Notice: Subject to any disclaimer, the term of this patent is extended or adjusted under 35 U.S.C. 154(b) by 590 days.

(21) Appl. No.: 10/074,751

(22) Filed: Feb. 13, 2002

(65) Prior Publication Data

US 2003/0152260 A1 Aug. 14, 2003

(51) Int. Cl.[7] ............................................... G06K 9/00
(52) U.S. Cl. ...................... 382/149; 382/190; 382/209; 382/294; 348/86; 348/126; 348/129
(58) Field of Search ......................... 382/141, 143–151, 382/190, 209, 294; 348/86, 125, 126, 129

(56) References Cited

U.S. PATENT DOCUMENTS

| | | | | |
|---|---|---|---|---|
| 4,475,122 A | * | 10/1984 | Green ........................ | 348/87 |
| 5,696,835 A | * | 12/1997 | Hennessey et al. ......... | 382/141 |
| 6,130,750 A | | 10/2000 | Ausschnitt et al. ......... | 356/401 |
| 6,330,355 B1 | * | 12/2001 | Chen et al. ................ | 382/144 |
| 6,346,426 B1 | | 2/2002 | Toprac et al. .............. | 438/8 |
| 2002/0164064 A1 | | 11/2002 | Karklin et al. ............. | 382/145 |
| 2002/0164065 A1 | | 11/2002 | Cai et al. ................... | 382/149 |
| 2003/0068565 A1 | * | 4/2003 | Ki et al. .................... | 430/5 |
| 2003/0174876 A1 | * | 9/2003 | Eran et al. ................. | 382/144 |

OTHER PUBLICATIONS

Lin. B.J., et al., "Single–Level Electric Testsites for Phase–Shifting Masks". SPIE. vol. 1673. pp. 221–228. Mar. 9–11. 1992.

* cited by examiner

Primary Examiner—Jon Chang
Assistant Examiner—Charles Kim
(74) Attorney, Agent, or Firm—Park, Vaughan & Fleming, LLP

(57) ABSTRACT

One embodiment of the invention provides a system that facilitates auto-alignment of images for defect inspection and defect analysis. The system operates by first receiving a reference image and a test image. Next, the system creates a horizontal cut line across the reference image and chooses a vertical feature on the reference image with a specified width along the horizontal cut line. The system also creates a vertical cut line across the reference image and chooses a horizontal feature on the reference image with the specified width along the vertical cut line. Finally, the system locates the vertical feature and the horizontal feature on the test image so that the reference image and the test image can be aligned to perform defect inspection and defect analysis.

28 Claims, 3 Drawing Sheets

REFERENCE IMAGE 102

TEST IMAGE 104

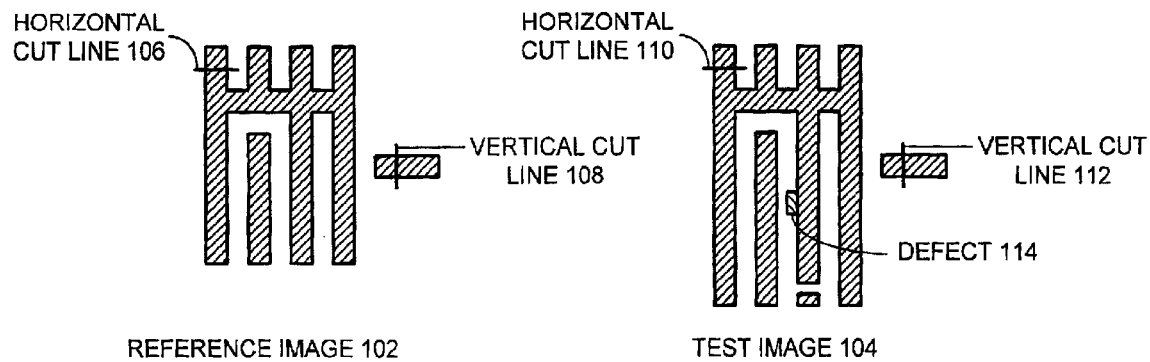
FIG. 1
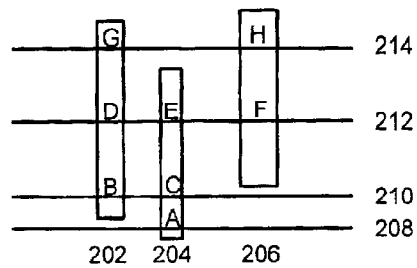
FIG. 2A
| 90-95 nm | 95-110 nm | 110-130 nm |
|---|---|---|
| A C E | B D G | F H |
GROUPING CHART 216
FIG. 2B

METHOD AND APPARATUS TO FACILITATE AUTO-ALIGNMENT OF IMAGES FOR DEFECT INSPECTION AND DEFECT ANALYSIS

BACKGROUND

1. Field of the Invention

The invention relates to the process of inspecting integrated circuit images. More specifically, the invention relates to a method and an apparatus to facilitate auto-alignment of mask and die images of integrated circuits for defect inspection and/or defect analysis.

2. Related Art

Integrated circuits can be produced through an optical lithography process that involves creating a mask with a pattern specifying where the various features of the integrated circuit are to be placed and then passing radiation through the mask to expose the pattern on a semiconductor wafer. This pattern defines where the surface of the semiconductor wafer is to be etched or where new material is to be added to create the integrated circuit.

As the features of an integrated circuit continue to get smaller, quality control becomes increasingly important in order to ensure that the integrated circuit functions properly. As part of this quality control, integrated circuit manufacturers often compare various images of an integrated circuit; for example, a manufacturer may compare a computer-generated image of the integrated circuit to a mask of the integrated circuit or may compare the mask to a die created from the mask. These comparisons can determine if defects exist and can help determine the cause of these defects.

These comparisons can be made by first aligning the images being compared and then subtracting, pixel-by-pixel, the reference image from the test image. The resultant difference is ideally zero for all pixels. Differences other than zero may indicate a defect in the test image, which can be analyzed to determine the severity of the defect, and can help determine the cause of the defect. During this defect analysis process, accurate alignment of the images is critical for this process to yield the expected results.

Current systems use an auto-correlation method to align these images. Auto-correlation is a very slow process because it requires a computationally intensive mathematical process to be performed pixel-by-pixel on the images. Also, the success rate of auto-correlation is not very high. The auto-correlation algorithm attempts to maximize the correlation coefficient:

$$c = \frac{\sum (x_{i,j} - \bar{x}) \times \sum (y_{i,j} - \bar{y})}{\left[\sum (x_{i,j} - \bar{x})^2\right]^{1/2} \times \left[\sum (y_{i,j} - \bar{y})^2\right]^{1/2}}$$

where $x_{i,j}$ and $y_{i,j}$ are the pixel values of the images at the respective location i and j, and $\bar{x}$ and $\bar{y}$ are the mean values of each image. Thus the auto-correlation algorithm is searching for a location by shifting the two images around to maximize the coefficient. This is an intensive calculation and the range of the shifted positions that are tried will limit the quality of the found position.

What is needed is a method and an apparatus to facilitate auto-alignment of integrated circuit images for defect inspection and defect analysis that do not exhibit the problems described above.

SUMMARY

One embodiment of the invention provides a system that facilitates auto-alignment of images for defect inspection and defect analysis. The system operates by first receiving a reference image and a test image. Next, the system creates a horizontal cut line across the reference image. The system then chooses a vertical feature on the reference image with a specified width along the horizontal cut line. Next, the system determines that the vertical feature substantially maintains the specified width over a specified range above and below the horizontal cut line. The system also creates a vertical cut line across the reference image. The system then chooses a horizontal feature on the reference image with the specified width along the vertical cut line. Next, the system determines that the horizontal feature substantially maintains the specified width over a specified range left and right of the vertical cut line. Finally, the system locates the vertical feature and the horizontal feature on the test image so that the reference image and the test image can be aligned to perform defect inspection and defect analysis.

In one embodiment of the invention, the system creates multiple horizontal cut lines across the reference image and then chooses a horizontal cut line including at least one vertical feature from these horizontal cut lines. The system also creates multiple vertical cut lines across the reference image and chooses a vertical cut line including at least one horizontal feature from these vertical cut lines. Next, the system creates multiple horizontal cut lines across the test image and chooses a test horizontal cut line by iterating through these horizontal cut lines until the test horizontal cut line includes a test vertical feature with substantially the same horizontal width as the vertical feature and the same neighboring characteristics on the feature, as determined by width. The system also creates multiple vertical cut lines across the test image and chooses a test vertical cut line by iterating through these vertical cut lines until the test vertical cut line includes a test horizontal feature with substantially the same vertical width as the horizontal feature and the same neighboring characteristics. Finally, the system aligns the reference image, and the test image using the horizontal cut line, the test horizontal cut line, the vertical cut line, and the test vertical cut line, and the respective features. As a convenience the cut lines will be referred to although it will be understood that the respective features are being aligned.

In one embodiment of the invention, the system aligns the reference image and the test image using edges of the vertical feature and the horizontal feature.

In one embodiment of the invention, the system aligns the reference image and the test image using midpoints of the vertical feature and the horizontal feature.

In one embodiment of the invention, the reference image includes an inspection mask image generated by mask inspection equipment, a mask image from a database, a wafer image, or a die.

In one embodiment of the invention, the test image includes an inspection mask image generated by mask inspection equipment, a mask image from a database, a wafer image, or a die.

In one embodiment of the invention, the system clusters feature widths within the reference image and then chooses a width that occurs most often as the specified width.

BRIEF DESCRIPTION OF THE FIGURES

FIG. 1 illustrates integrated circuit images in accordance with an embodiment of the invention.

FIG. 2A illustrates multiple horizontal cuts across an integrated circuit image in accordance with an embodiment of the invention.

FIG. 2B illustrates width groupings in accordance with an embodiment of the invention.

DETAILED DESCRIPTION

Integrated Circuit Images

Figure 3:
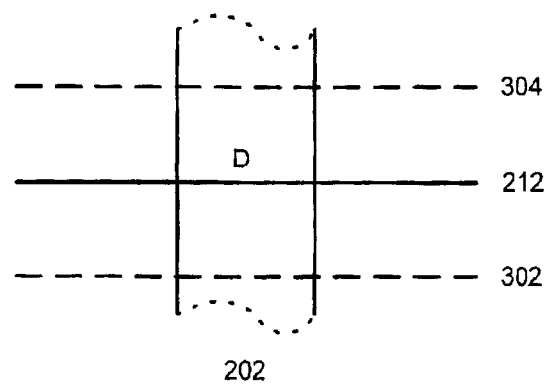
FIG. 3 illustrates determining feature width in the neighborhood of a horizontal cut in accordance with an embodiment of the invention.

FIG. 1 illustrates integrated circuit images in accordance with an embodiment of the invention. Reference image 102 and test image 104 include the same features of an integrated circuit, however, their sizes may not be identical, as shown. Reference image 102 may be a computer-generated image generated from a GDS-II description or other system description of the layout, a mask image, or a wafer image used for comparison with test image 104. Test image 104 may also be a computer-generated image, a mask image, or a wafer image used for comparison with reference image 102, and may include defects such as defect 114.

In operation, the system places horizontal and vertical cut lines on reference image 102. FIG. 1 illustrates horizontal cut line 106 and vertical cut line 108 on reference image 102. The system also places horizontal and vertical cut lines on test image 104. FIG. 1 illustrates horizontal cut line 110 and vertical cut line 112 on test image 104. The system aligns reference image 102 and test image 104 by locating the same features using horizontal cut lines 106 and 110 and vertical cut lines 108 and 112. Once aligned, the system can compute the difference between reference image 102 and test image 104 for defect analysis. For example, defect 114 could be identified and reported to a user of the software tool, e.g. by visually highlighting the area, generating an error report, etc. The user might then simulate the region with the defect using a tool such as the Virtual Stepper® to determine if a particular mask error should be reported. Virtual Stepper® is a registered trademark of Numerical Technologies, Inc. of San Jose, Calif. Determining if a particular mask error should be reported can involve defect severity scoring. Inspection, severity scoring, and mask error reporting are described in more detail in U.S. patent applications Ser. No. 09/130,996, entitled "Visual Inspection and Verification System," by Fang-Cheng Chang, et al, filed Aug. 7, 1998, which is hereby incorporated by reference; Ser. No. 09/815,023, entitled "System and Method of Providing Mask Quality Control," by Lynn Cai, et al, filed Mar. 20, 2001, which is hereby incorporated by reference; and Ser. No. 09/815,025, entitled "System and Method of Providing Mask Defect Printability Analysis," by Lynn Cai, et al, filed Mar. 20, 2001, which is hereby incorporated by reference.

Using Multiple Cut Lines

FIG. 2A illustrates multiple horizontal cuts across an integrated circuit image in accordance with an embodiment of the invention. Note that this integrated circuit image can be either reference image 102 or test image 104. Cut lines 208, 210, 212, and 214 have been placed across image features 202, 204, and 206. More specifically, cut line 208 crosses feature 204 at point A; cut line 210 crosses features 202 and 204 at points B and C, respectively; cut line 212 crosses features 202, 204, and 206 at points D, E, and F, respectively; and cut line 214 crosses features 202 and 206 at points G and H, respectively. More or fewer cut lines can be used. The same procedures and discussions apply equally to vertical cut lines so no further discussion of vertical cut lines will be included herein. After cut lines have been placed across the image, the crossing points are grouped according to width.

FIG. 2B illustrates width groupings in accordance with an embodiment of the invention. Feature 202 has a nominal width between 95 and 110 nm; feature 204 has a nominal width between 90 and 95 nm; and feature 206 has a nominal width between 110 and 130 nm. As shown in grouping chart 216, points A, C, and E are grouped together with a nominal width of 90–95 nm; points B, D, and G are grouped together with a nominal width of 95–110 nm; and points F and H are grouped together with a nominal width of 110–130 nm. The system selects a feature with the selected width from one of the groups in grouping chart 216, for example feature 202 at point D. In one embodiment, the chosen point is a feature having median width. In another embodiment the chosen point is a feature having a width that occurs most often. Next, the system determines if the width is substantially constant within a specified range from point D as described below in conjunction with FIG. 3. If the width is not substantially constant, the system selects a different point before continuing. The next point can be from within the same width group or another point with a different width, e.g. point F. A substantially constant width is used to avoid corners and defect locations and to assure better alignment results. If no points are found that work, the criteria for the range above and below the points can be lowered. If still no points are found, the alignment fails.

Determining Feature Width

FIG. 3 illustrates the process of determining feature width in the neighborhood of a horizontal cut in accordance with an embodiment of the invention. The system determines the width at several points on feature 202 about cut line 212 between limits 302 and 304. Limits 302 and 304 are selected to give assurance that feature 202 has a substantially constant width and that the selected point can be used to make a valid comparison between reference image 102 and test image 104. After determining that the selected point on reference image 102 can be used to make a valid comparison, the system attempts to locate the equivalent point on test image 104 as described below in conjunction with FIG. 5.

Image Aligner

Figure 4:
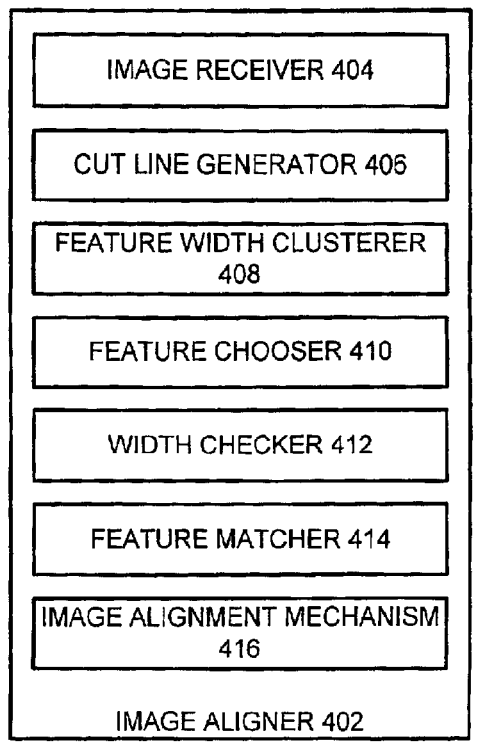
FIG. 4 illustrates image aligner 402 in accordance with an embodiment of the invention.

FIG. 4 illustrates image aligner 402 in accordance with an embodiment of the invention. Image aligner 402 includes image receiver 404, cut line generator 406, feature width clusterer 408, feature chooser 410, width checker 412, feature matcher 414, and image alignment mechanism 416. Image receiver 404 receives reference image 102 and test image 104 for alignment. Cut line generator 406 creates both horizontal and vertical cut lines across reference image 102 and test image 104 as described above in reference to FIGS. 1–3.

After cut line generator 406 creates cut lines across reference image 102 and test image 104, feature width clusterer 408 classifies each feature according to width and sorts the features into groups as described above in conjunction with FIG. 2A. Feature chooser 410 then selects a feature for comparison as described below in conjunction with FIG. 5.

Width checker 412 checks the width of the feature chosen by feature chooser 410 to ensure that the width of the chosen feature remains substantially constant over a small range near the cut line by stepping small increments in both directions from the cut line and comparing the feature width with the feature width at the cut line.

After features have been chosen on both horizontal and vertical cut lines, feature matcher 414 matches the features on test image 104 to match the selected features on reference image 102. A feature on the test image can be said to be matched with a feature on the reference image if (1) it has substantially the same width and (2) substantially the same neighborhood properties as the feature on the reference image. In one embodiment, the tolerance is allowed to compensate for slightly different image sizes, e.g. plus-or-minus ten percent. When matching features have been found on both reference image 102 and test image 104, image alignment mechanism 416 aligns these images for subtraction and subsequent defect inspection and analysis.

Aligning the Images

Figure 5:
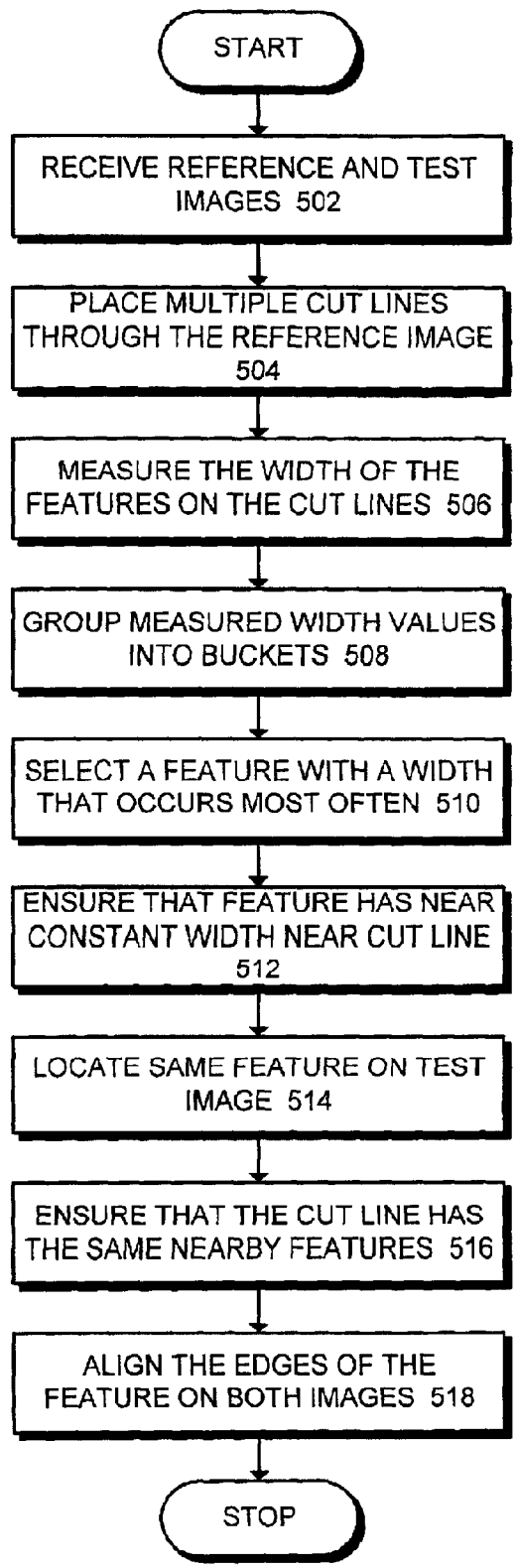
FIG. 5 is a flowchart illustrating the process of aligning a test image with a reference image in accordance with an embodiment of the invention.

FIG. 5 is a flowchart illustrating the process of aligning a test image with a reference image in accordance with an embodiment of the invention. The system starts by receiving reference image 102 and test image 104 (step 502). Next, the system places multiple cut lines through reference image 102 (step 504). The system then measures the width of the features on the cut lines (step 506).

After measuring the width of the features, the system groups the measured width values into buckets sorted according to size (step 508). Next, the system selects a feature with a width that occurs most often from the measured width values (step 510). The system then ensures that the width is substantially constant near the selected cut line by iterating about the cut line in small increments (step 512). If the width is not substantially the same, a new point is selected.

After selecting a point on reference image 102, the system locates the same feature on test image 104 (step 514). Next, the system ensures that the cut line has the same features near the selected feature to determine that the features are the same (step 516). Finally, the system aligns the edges of the feature on both images (step 518). The system can also align the midpoints of the feature. Note that the same process is followed to align the images using the vertical cut lines for the vertical direction alignment. After both directions are aligned, the images are aligned.

The preceding description is presented to enable one to make and use the invention, and is provided in the context of a particular application and its requirements. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

The foregoing descriptions of embodiments of the invention have been presented for purposes of illustration and description only. They are not intended to be exhaustive or to limit the invention to the forms disclosed. The scope of the invention is defined by the appended claims.

What is claimed is:

1. A method to facilitate auto-alignment of images for defect inspection and defect analysis, comprising:

receiving a reference image and a test image;

creating a horizontal cut line across the reference image;

choosing a vertical feature on the reference image with a specified width along the horizontal cut line;

determining that the vertical feature substantially maintains the specified width over a specified range above and below the horizontal cut line;

locating a corresponding vertical feature on the test image;

creating a vertical cut line across the reference image;

choosing a horizontal feature on the reference image with the specified width along the vertical cut line;

determining that the horizontal feature substantially maintains the specified width over a specified range left and right of the vertical cut line;

locating a corresponding horizontal feature on the test image; and aligning the reference image and the test image by aligning the vertical feature on the reference image with the corresponding vertical feature on the test image and aligning the horizontal feature on the reference image with the corresponding horizontal feature on the test image.

2. The method of claim 1, further comprising:

creating a first plurality of horizontal cut lines across the reference image;

choosing the horizontal cut line including at least one vertical feature from the first plurality of horizontal cut lines;

creating a first plurality of vertical cut lines across the reference image;

choosing the vertical cut line including at least one horizontal feature from the first plurality of vertical cut lines;

creating a second plurality of horizontal cut lines across the test image;

choosing a test horizontal cut line from the second plurality of horizontal cut lines, by iterating through the second plurality of horizontal cut lines until the test horizontal cut line includes a test vertical feature with a substantially same horizontal width and same neighborhood characteristics as the vertical feature;

creating a second plurality of vertical cut lines across the test image;

choosing a test vertical cut line from the second plurality of vertical cut lines, by iterating through the second plurality of vertical cut lines until the test vertical cut line includes a test horizontal feature with a substantially same vertical width and same neighborhood characteristics as the horizontal feature;

aligning the reference image and the test image in a horizontal direction using the horizontal cut line and the test horizontal cut line; and aligning the reference image and the test image in a vertical direction using the vertical cut line and the test vertical cut line.

3. The method of claim 2, further comprising aligning the reference image and the test image using edges of the vertical feature and the horizontal feature.

4. The method of claim 2, further comprising aligning the reference image and the test image using midpoints of the vertical feature and the horizontal feature.

5. The method of claim 1, wherein the reference image includes one of:
- an inspection mask generated by mask inspection equipment;
- a mask image from a database;
- a wafer image; and
- a die image.

6. The method of claim 1, wherein the test image includes one of:
- an inspection mask generated by mask inspection equipment;
- a mask image from a database;
- a wafer image; and
- a die image.

7. The method of claim 1, further comprising:
- clustering feature widths within the reference image; and
- choosing a width that occurs most often as the specified width.

8. A computer-readable storage medium storing instructions that when executed by a computer cause the computer to perform a method to facilitate auto-alignment of images for defect inspection and defect analysis, the method comprising:
- receiving a reference image and a test image;
- creating a horizontal cut line across the reference image;
- choosing a vertical feature on the reference image with a specified width along the horizontal cut line;
- determining that the vertical feature substantially maintains the specified width over a specified range above and below the horizontal cut line;
- locating a corresponding vertical feature on the test image;
- creating a vertical cut line across the reference image;
- choosing a horizontal feature on the reference image with the specified width along the vertical cut line;
- determining that the horizontal feature substantially maintains the specified width over a specified range left and right of the vertical cut line;
- locating a corresponding horizontal feature on the test image; and
- aligning the reference image and the test image by aligning the vertical feature on the reference image with the corresponding vertical feature on the test image and aligning the horizontal feature on the reference image with the corresponding horizontal feature on the test image.

9. The computer-readable storage medium of claim 8, the method further comprising:
- creating a first plurality of horizontal cut lines across the reference image;
- choosing the horizontal cut line including at least one vertical feature from the first plurality of horizontal cut lines;
- creating a first plurality of vertical cut lines across the reference image;
- choosing the vertical cut line including at least one horizontal feature from the first plurality of vertical cut lines;
- creating a second plurality of horizontal cut lines across the test image;
- choosing a test horizontal cut line from the second plurality of horizontal cut lines, by iterating through the second plurality of horizontal cut lines until the test horizontal cut line includes a test vertical feature with a substantially same horizontal width and same neighborhood characteristics as the vertical feature;
- creating a second plurality of vertical cut lines across the test image;
- choosing a test vertical cut line from the second plurality of vertical cut lines, by iterating through the second plurality of vertical cut lines until the test vertical cut line includes a test horizontal feature with a substantially same vertical width and same neighborhood characteristics as the horizontal feature;
- aligning the reference image and the test image in a horizontal direction using the horizontal cut line and the test horizontal cut line; and
- aligning the reference image and the test image in a vertical direction using the vertical cut line and the test vertical cut line.

10. The computer-readable storage medium of claim 9, the method further comprising aligning the reference image and the test image using edges of the vertical feature and the horizontal feature.

11. The computer-readable storage medium of claim 9, the method further comprising aligning the reference image and the test image using midpoints of the vertical feature and the horizontal feature.

12. The computer-readable storage medium of claim 8, wherein the reference image includes one of:
- an inspection mask generated by mask inspection equipment;
- a mask image from a database;
- a wafer image; and
- a die image.

13. The computer-readable storage medium of claim 8, wherein the test image includes one of:
- an inspection mask generated by mask inspection equipment;
- a mask image from a database;
- a wafer image; and
- a die image.

14. The computer-readable storage medium of claim 8, the method further comprising:
- clustering feature widths within the reference image; and
- choosing a width that occurs most often as the specified width.

15. An apparatus to facilitate auto-alignment of images for defect inspection and defect analysis, comprising:
- a receiving mechanism that is configured to receive a reference image and a test image;
- a creating mechanism that is configured to create a horizontal cut line across the reference image;
- wherein the creating mechanism is further configured to create a vertical cut line across the reference image;
- a choosing mechanism that is configured to choose a vertical feature on the reference image with a specified width along the horizontal cut line;
- wherein the choosing mechanism is further configured to choose a horizontal feature on the reference image with the specified width along the vertical cut line;
- a determining mechanism that is configured to determine that the vertical feature substantially maintains the specified width over a specified range above and below the horizontal cut line;

wherein the determining mechanism is further configured to determine that the horizontal feature substantially maintains the specified width over a specified range left and right of the vertical cut line;

a locating mechanism that is configured to locate a corresponding vertical feature on the test image;

wherein the locating mechanism is further configured to locate a corresponding horizontal feature on the test image; and an aligning mechanism that is configured to align the reference image and the test image by aligning the vertical feature on the reference image and the corresponding vertical feature on the test image and by aligning the horizontal feature on the reference image and the corresponding horizontal feature on the test image.

16. The apparatus of claim 15, wherein the creating mechanism is further configured to create a first plurality of horizontal cut lines across the reference image;

the choosing mechanism is further configured to choose the horizontal cut line including at least one vertical feature from the first plurality of horizontal cut lines;

the creating mechanism is further configured to create a first plurality of vertical cut lines across the reference image;

the choosing mechanism is further configured to choose the vertical cut line including at least one horizontal feature from the first plurality of vertical cut lines;

the creating mechanism is further configured to create a second plurality of horizontal cut lines across the test image;

the choosing mechanism is further configured to choose a test horizontal cut line from the second plurality of horizontal cut lines, by iterating through the second plurality of horizontal cut lines until the test horizontal cut line includes a test vertical feature with a substantially same horizontal width and same neighborhood characteristics as the vertical feature;

the creating mechanism is further configured to create a second plurality of vertical cut lines across the test image;

the choosing mechanism is further configured to choose a test vertical cut line from the second plurality of vertical cut lines, by iterating through the second plurality of vertical cut lines until the test vertical cut line includes a test horizontal feature with a substantially same vertical width and same neighborhood characteristics as the horizontal feature;

the aligning mechanism is further configured to align the reference image and the test image in a horizontal direction using the horizontal cut line and the test horizontal cut line; and the aligning mechanism is further configured to align the reference image and the test image in a vertical direction using the vertical cut line and the test vertical cut line.

17. The apparatus of claim 16, wherein the aligning mechanism is further configured to align the reference image and the test image using edges of the vertical feature and the horizontal feature.

18. The apparatus of claim 16, wherein the aligning mechanism is further configured to align the reference image and the test image using midpoints of the vertical feature and the horizontal feature.

19. The apparatus of claim 15, wherein the reference image includes one of:

an inspection mask generated by mask inspection equipment;

a mask image from a database;

a wafer image; and a die image.

20. The apparatus of claim 15, wherein the test image includes one of:

an inspection mask generated by mask inspection equipment;

a mask image from a database;

a wafer image; and a die image.

21. The apparatus of claim 15, further comprising:

a clustering mechanism that is configured to cluster feature widths within the reference image; and wherein the choosing mechanism is further configured to choose a width that occurs most often as the specified width.

22. A system to facilitate auto-alignment of images for defect inspection and defect analysis, comprising:

receiving means for receiving a reference image and a test image;

creating means for creating a horizontal cut line across the reference image;

choosing means for choosing a vertical feature on the reference image with a specified width along the horizontal cut line;

determining means for determining that the vertical feature substantially maintains the specified width over a specified range above and below the horizontal cut line;

locating means for locating a corresponding vertical feature on the test image;

said creating means for creating a vertical cut line across the reference image;

said choosing means for choosing a horizontal feature on the reference image with the specified width along the vertical cut line;

said determining means for determining that the horizontal feature substantially maintains the specified width over a specified range left and right of the vertical cut line;

said locating means for locating a corresponding horizontal feature on the test image; and aligning means for aligning the reference image and the test image by aligning the vertical feature on the reference image to the corresponding vertical feature on the test image and by aligning the horizontal feature on the reference image and the corresponding horizontal feature on the test image.

23. The system of claim 22, further comprising:

said creating means for creating a first plurality of horizontal cut lines across the reference image;

said choosing means for choosing the horizontal cut line including at least one vertical feature from the first plurality of horizontal cut lines;

said creating means for creating a first plurality of vertical cut lines across the reference image;

said choosing means for choosing the vertical cut line including at least one horizontal feature from the first plurality of vertical cut lines;

said creating means for creating a second plurality of horizontal cut lines across the test image;

said choosing means for choosing a test horizontal cut line from the second plurality of horizontal cut lines, by iterating through the second plurality of horizontal cut lines until the test horizontal cut line includes a test vertical feature with a substantially same horizontal width as the vertical feature and a substantially same neighboring characteristics on the test vertical feature as determined by width;

said creating means for creating a second plurality of vertical cut lines across the test image;

said choosing means for choosing a test vertical cut line from the second plurality of vertical cut lines, by iterating through the second plurality of vertical cut lines until the test vertical cut line includes a test horizontal feature with a substantially same vertical width as the horizontal feature and a substantially same neighboring characteristics on the test horizontal feature as determined by width;

said aligning means for aligning the reference image and the test image in a horizontal direction using the horizontal cut line and the test horizontal cut line; and said aligning means for aligning the reference image and the test image in a vertical direction using the vertical cut line and the test vertical cut line.

24. The system of claim 23, further comprising said aligning means for aligning the reference image and the test image using edges of the vertical feature and the horizontal feature.

25. The system of claim 23, further comprising said aligning means for aligning the reference image and the test image using midpoints of the vertical feature and the horizontal feature.

26. The system of claim 22, wherein the reference image includes one of:

an inspection mask generated by mask inspection equipment;

a mask image from a database;

a wafer image; and a die image.

27. The system of claim 22, wherein the test image includes one of:

an inspection mask generated by mask inspection equipment;

a mask image from a database;

a wafer image; and a die image.

28. The system of claim 22, further comprising:

clustering means for clustering feature widths within the reference image; and said choosing means for choosing a width that occurs most often as the specified width.

\* \* \* \* \*